3,490,906

PROCESS FOR PREPARING PRINTING PLATES AND DEVELOPER COMPOSITIONS THEREFOR

Ralph Kingsley Blake, Westfield, N.J., assignor to E. I. du Pont de Nemours and Company, Wilmington, Del., a corporation of Delaware No Drawing. Filed Oct. 6, 1964, Ser. No. 401,993
Int. Cl. G03c 5/54, 5/30; G03f 7/06
U.S. Cl. 96—29 15 Claims

ABSTRACT OF THE DISCLOSURE

A process of image reproduction which comprises: (a) forming a metallic silver image in a water-permeable colloid layer of a photographic film having a silver halide emulsion layer; (b) treating the surface of the element with a liquid solution containing an adjuvant to enhance the oleophilic character of the silver image; and (c) using the plate to print by lithography.

This invention relates to the preparation of lithographic printing plates, and specifically to a photographic method for the preparation of lithographic printing plates.

Various photographic methods are employed in the lithographic art for the formation of an oleophilic, that is, greasy ink loving, image on an oleophobic, that is, greasy ink repellent, surface of a lithographic printing plate. In such photographic methods a negative is usually produced by photographing the original. Subsequently the lithographic plate in which the oleophobic surface has been presensitized with a material such as a resin-forming diazo compound or with a dichromate compound capable of tanning a colloid when exposed to light, is exposed to light through the negative whereby the exposed areas are converted to an oleophilic image which accepts ink and prints from these areas. The light-sensitive materials remaining in the unexposed portions of the plate, or the non-imaged areas is removed, e.g., by washing, to provide an oleophobic surface in the non-imaged areas. Such plates may be mounted on a roller of an offset printing press, for example, and passed in contact with an aqueous fountain solution and a printing ink. The inked image is then transferred to a blanket, and applied to the sheet to be printed.

The making of superior planographic printing plates requires delicate balancing of a variety of coating characteristics, some of which tend to conflict with others. By way of example, the coating must accept and retain a greasy image, while at the same time accepting and retaining the aqueous fountain solution. The fountain solution must be retained in such manner as to avoid "undermining" the image in prolonged use. The coating must permit the making of erasures, when necessary, without causing "halos" or other undesirable images to appear. The image must remain sharp throughout prolonged use, and not "tone." "Stop-go" characteristics, that is, the ability to print satisfactory copies after a period of machine shutdown, must also be good. These and other characteristics must be properly balanced to provide a superior plate, due regard being had for ease of manufacturing and over-all cost.

It is an object of this invention to produce a new superior lithographic printing plate. Another object of this invention is to obtain a plate that will immediately print clean accurate copies. A further object is to obtain a plate that will print such copies immediately after the press has been stopped and started again. A still further object of this invention is to make a silver image on the surface of the unexposed areas of the photographic element oleophilic so that the element can be used as a lithographic printing plate yielding positive copies, thus eliminating the need for preparing a negative film as an intermediate. Additional objects of this invention will be apparent from the following description of the invention.

The process of the preferred invention comprises:

(1) Forming a metallic silver image in the least exposed or unexposed areas at the surface of a light-sensitive photographic element by silver transfer development, also called solution physical development, (2) Treating said surface of the element with a liquid solution containing an adjuvant having an oleophilic group to enhance the oleophilic character of the image, (3) Treating said surface of said element with an aqueous fountain solution, and (4) Applying to the treated surface an ink having an oleophilic binder whereby said greasy ink attaches to the surface area where the metallic silver was formed by silver transfer development. The inked element is then used to print onto any suitable ink-receptive surface.

A "positive" copy is defined herein as an inked image on the copy sheet corresponding to the original while a "negative" copy is defined herein as an inked background on the copy sheet with the image being void of ink. A "halftone" copy relates to a modification of the above definitions where a screen pattern is used to break the image up into halftone dots during one of the exposure steps.

This invention includes any process in which an oleophilic silver image is formed at the surface of an oleophobic colloid layer by means of silver transfer development within said layer and treatment of the image with an adjuvant to render this image oleophilic and ink receptive. It is not restricted to the process disclosed in the following specific description and examples.

When a light-sensitive element, e.g., a gelatino-silver halide film, is exposed and developed with low-solvent conventional developers, the surface of the exposed areas of the element is made relatively oleophilic in comparison to the unexposed surface area. However, when a silver halide solvent and nucleating agent are added in the proper amounts to the above type of developers, silver transfer takes place in the unexposed areas and a silver image is formed at the surface of the layer providing the developer is sufficiently rapid in its action. A two-agent developer of the superadditive type is preferred, particularly in a case of a film which is classified in the art as a "slow-developing" film. A silver bromide-silver iodide X-ray type film is a "slow-developing" film. Also the developer may have to be aided by increasing the pH of the solution, which in itself increases the developing rate. In view of this, an increase of pH is seen as an additive to the synergism of the two-agent developer.

The invention in particular consists in the treatment of the element as described above with an adjuvant to make the surface silver image more oleophilic than the surfaces of the exposed regions. It does not matter whether the silver surface image is oleophilic or oleophobic in relation to the background surface before the treatment with the adjuvant; the adjuvant is so selected that it will cause the silver surface image to be more oleophilic than the non-image area in either instance.

The process of this invention involves, in part, improving the oleophilic properties of a silver surface image, produced by silver transfer development, by treating said silver with an organic compound, herein called the adjuvant, containing an oleophilic group, said organic compound being such that, when it is placed in contact with silver it becomes integrated with the silver in the silver surface image but not with the non silver surface, thus rendering the silver surface oleophilic, or more oleophilic, by means of the oleophilic group. By defining the adjuvant as one that "becomes integrated with the silver in the silver surface image," it is intended to indicate that the adjuvant is adsorbed or bound to the silver, of the silver surface image but may not necessarily react chemically with the total mass of the silver. Since the adsorption of a chemical compound on a metal surface may not always be a purely physical phenomenon, adsorption of this nature can comprise a super-ficial chemical action whose nature is not always understood.

In order that the adjuvant be adsorbed it has been found that it should contain one or several groups. These groups comprise the following:

(1) —SH or a group enolizable to —SH
(2) —SR where R is an easily hydrolyzable group to give —SH, such as an acyl, amidinium or $NHR_1$ where $R_1$ is an alkyl, aryl, aralkyl, cycloalkyl or heterocyclic group
(3) A thioacid group
(4) A thioamide group
(5) A selenium analogue of groups (1) through (4)
(6) An isothiocyanate group
(7) A cyanine dye group
(8) An amine group
(9) A phosphine and phosphine oxide group In order that the adjuvant produce oleophilic properties in the silver at the surface, the adjuvant should contain one or more oleophilic groups in its molecule. Generally, the required oleophilic characteristics are obtained when the adjuvant contains an alkyl chain of at least four carbon atoms, e.g., n-butyl, n-decyl and n-hexadecyl mercaptan.

However, when the adjuvant does not contain groups which reduce the oleophilic properties, the fatty chain can contain less than four carbon atoms, e.g., potassium ethyl xanthate.

Other adjuvants which contain the indicated groups in the molecule and which, consequently, can be used according to this invention, are the following:

(1) Dodecyl-mercaptan, benzothiazol-2-thiol, and the triazinethiols having the general formula:

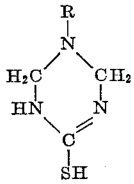

where R represents an alkyl or cycloalkane group, chosen preferably but not exclusively in the interval $C_4$ to $C_{12}$. Examples of triazine-thiols are 1-dodecyl-1,2,4,5-tetrahydro-1,3,5-thiazine-4-thiol and 1-octyl-1,2,4,5-tetrahydro-1,3,5-triazine-4-thiol.

(2) The chlorohydrate of S-diethylaminoethyl-isothiouronium chloride.

(3) The thioacids and their salts, e.g., thiobenzoic acid or potassium octyl-xanthate, the dithiocarbamates, e.g., ethyl-dithiocarbamate, the zinc salt of dibutyl-dithiocarbamate, the polysulfur derivatives of dithiocarbamates which are activated by alkalis such as the tetraethylthiuramedisulfide.

(4) The thioamides, such as phenylthiourea, N-(N-octylthiocarbamyl)-glycocoll, thiopropioanilide, phenylthiosemicarbazide.

(5) The selenious analogues of the above compounds in (1), (2), (3) and (4), e.g., phenylselenosemicarbazide, 2-selenvbenzothiazole.

(6) The isothiocyanates, e.g., phenylisothiocyanate.

In this invention the silver halide emulsion layer is preferably overcoated with a transparent receptive layer, sometimes called the antiabrasion layer, which is normally a gelatin layer. It is into this layer that the nucleating agents will permeate to allow the surface silver layer to form. The receptive layer should be a hardened nonremovable colloid layer which is permeable to water. The receptive layer may be nucleated after exposure and during treatment in the developing solution. Some light-sensitive elements contain silica in this gelatin overcoating, known as the antiabrasion layer, but the silica is not essential to the process. If the light-sensitive element does not contain an antiabrasion layer the silver surface image will form on and/or in the top portion of the emulsion layer of the element via the nucleating agent mechanism.

In the unexposed areas during development, it is believed that the silver ions migrate to or near the surface of the light-sensitive element as complex ions. The nucleating agents, having permeated the surface region, are the starting points for reduction of the silver ion complex to metallic silver. If too much solvent action occurs and insufficient nucleating agent, e.g., sodium sulfide, is present, the dissolved silver may diffuse to the surface and plate out as the silver image which is too easily abraded. When the solvent action is too low and the nucleating agent concentration is too high, the sulfide ions apparently migrate too deep into the emulsion and fog the individual silver halide grains. This forms black fog silver within the emulsion and the surface above said silver cannot be made oleophilic by mercaptan treatment. When there is a proper amount of solvent action and a proper concentration of nucleating agent, silver sulfide nuclei form in the antiabrasion layer, or at the top of the emulsion layer, if there is no antiabrasion layer on which metallic silver deposits being formed by silver transfer development from the unexposed silver halide, to give a silver surface image.

The attachment of the adjuvant to the silver surface image can rarely cause a plate to have a longer press life than that of the underlying metallic silver layer. The plate is no better than its underlying support members, so if the metallic silver is loosely attached, the plate will have a comparatively short press life.

The nucleating agent must be capable of diffusing into the antiabrasion layer or the top of the emulsion layer if there is no antiabrasion layer. Examples of this agent are sodium selenide, sodium sulfide, sodium thiocyanate and thiourea. The concentration of the nucleating agent in the developer solution varies with the type of developer and with the type of light-sensitive element being used in this process. The operable concentrations can be readily determined in each case by relatively simple laboratory techniques, and optimum concentrations can be determined in the same manner.

The silver halide solvent in the developer can be a thiosulfate or a thiocyanate compound and has the function of dissolving and transporting silver to the nuclei where it is reduced to form a silver image.

When a two-agent developer is used in a two-bath developer containing a nucleating agent and a silver halide solvent, a printing plate may be obtained which produces positive copies. The preferred method then consists of the first agent being chosen from the group consisting of 1-phenyl-3-pyrazolidone, 1-phenyl-4-methyl-3-pyrazolidone, and p-methylaminophenol sulfate, and the second agent being chosen from the group consisting of hydroquinone and 2,4-diaminophenol. If a two-bath developer is used, two different sets of agents can be used in the two baths.

The most preferred embodiment of the process of this invention is as follows:

(A) A light-sensitive silver halide emulsion on a film support is exposed in a camera through the film support or to the emulsion side in a camera with an optically reversing prism.

(B) The exposed film is developed in a silver transfer developer containing sodium sulfite, hydroquinone, ethylene glycol, benzotriazole, 1-phenyl-3-pyrazolidone, N-methyl-2-pyrrolidone, potassium carbonate, sodium sulfide, potassium thiocyanate, sodium hydroxide, water, and Sequestrene® NA3T (trisodium salt of ethylene diamine tetra-acetic acid).

(C) The developed film is washed in water.

(D) The wet developed film is treated with an aqueous solution containing lauryl mercaptan to prepare a lithographic printing plate.

(E) The lithographic printing plate is inked with an ink containing an oleophilic binding agent.

In Examples 16 and 17 which follow, several routes to obtain silver surface images by silver transfer development which have not already been elaborated upon are presented.

The following examples illustrate this invention but are not intended to limit it in any way.

EXAMPLE I

A monobath developer solution was prepared as follows:

| | | |
|---|---|---|
| Water | ml | 800 |
| Sodium sulfite (anhydrous) | gm | 80 |
| Hydroquinone (anhydrous) | gm | 16 |
| Boric acid ($H_3BO_3$) | gm | 5.5 |
| Potassium bromide (anhydrous) | gm | 2 |
| Sodium hydroxide (24 grams dissolved in sufficient water to make up 100 ml. of solution) | ml | 100 |
| Water to make up to 1000 ml. | | |

The above developer solution was labeled developer A. Fifty grams of potassium thiocyanate (anhydrous) were added to one liter of developer A.

A photographic film of the lithographic type was exposed at a distance of 24 inches for five seconds through a high-contrast photographic positive transparency in contact with the film by a high-intensity, tungsten-filament, incandescent lamp (No. 2 General Electric Photoflood lamp) operated at 20 volts A.C. The film had a high-contrast silver chloride-silver bromide orthochromatically sensitized emulsion, in which the silver salt contained 70 mole percent silver chloride and 30 mole percent silver bromide and contained 60 grams of gelatin per mole of silver halide, overcoated with a clear, hardened gelatin layer, and a base coated with a dyed gelatin-NH backing. The exposed film was immersed in the monobath developer solution for one minute and subsequently washed with water for one minute. A high contrast, highly-reflective, positive silver image was obtained on and/or in the antiabrasion surface coating of the emulsion layer. The strip was then treated on the emulsion side with a lauryl mercaptan solution (one gram of lauryl mercaptan dissolved in sufficient ethanol to make up one liter of solution), and washed with water after the lauryl mercaptan treatment. This film constituted a printing plate. The sample was dried and mounted on a conventional offset duplicating press. The strip was wetted with a water-bearing sponge. The strip was inked with a conventional greasy lithographic ink and, using water as the fountain solution, many positive copies were obtained.

EXAMPLE II

A monobath developer solution was prepared as follows:

| | | |
|---|---|---|
| Water | ml | 800 |
| Sodium sulfite (anhydrous) | gm | 80 |
| Hydroquinone (anhydrous) | gm | 16 |
| 1-phenyl-4-methyl-3-pyrazolidone (reagent grade) | gm | 1 |
| Boric acid ($H_3BO_3$) | gm | 5.5 |
| Potassium bromide (anhydrous) | gm | 2 |
| 6-nitrobenzimidazole-nitrate (one gram dissolved in sufficient ethanol to make up 100 ml. of solution) | ml | 40 |
| Sodium hydroxide (24 grams dissolved in sufficient water to make up 100 ml. of solution) | ml | 100 |
| Water to make up to 1000 ml. | | |

The above developer solution was labeled developer B. Fifty grams of potassium thiocyanate (anhydrous) were added to one liter of developer B.

A photographic film of the lithographic type as described in Example I, was exposed at a distance of 24 inches for five seconds through a high-contrast photographic positive transparency in contact with the film by a #2 General Electric Photoflood lamp operated at 20 volts A.C. The exposed film was immersed in the monobath developer solution and subsequently washed with water. A high contrast, highly-reflective, positive silver image was obtained on and/or in the antiabrasion surface coating of the emulsion layer. The strip was then treated on the emulsion side with a lauryl mercaptan solution (one gram of lauryl mercaptan dissolved in sufficient ethanol to make up one liter of solution), and washed with water after the mercaptan treatment. This film constituted a printing plate. The sample was dried and mounted on the offset machine. The strip was wetted with a water-bearing solution. The strip was inked with a conventional greasy lithographic ink and, using water as the fountain solution, many positive copies were obtained.

EXAMPLE III

A two-bath developer solution was prepared by adding ten ml. of sodium sulfide (0.1 molar solution) to one liter of developer A, described in Example I, which was termed the first bath, and by adding 50 ml. of potassium thiocyanate (one gram dissolved in sufficient water to make up one ml. of solution) and ten ml. of sodium sulfide (0.1 molar solution) to one liter of developer A, which was termed the second bath.

A light-sensitive photographic lithographic film as described in Example I was exposed at a distance of 24 inches for five seconds through a high-contrast photographic positive transparency in contact with the film by a #2 General Electric Photoflood lamp operated at 20 volts A.C. The exposed film was immersed in the first bath for 30 seconds and then in the second bath for one minute, and washed with water for one minute. A high contrast, highly-reflective, positive silver image was obtained on and/or in the antiabrasion surface coating of the emulsion layer, treated for fifteen seconds on the emulsion side with a one percent lauryl mercaptan-ethanol solution, and washed with water for one minute. The mercaptan treatment and water wash were repeated, and the strip was dried. The strip was used as a printing master which produced positive copies when placed on a conventional offset duplicating press and allowed nearly instant start up. About one hundred positive copies were produced with no significant signs of deterioration.

EXAMPLE IV

A mono-bath developer solution was prepared by adding ten ml. of sodium sulfide (0.1 molar solution) and 30 ml. of potassium thiocyanate (anhydrous) to one liter of developer B, described in Example II.

A light-sensitive photographic lithographic film as described in Example I was exposed for five seconds through a high-contrast photographic positive transparency in contact with the film by a #2 General Electric Photoflood lamp operating at 20 volts A.C. at a distance of 24 inches. The exposed film was immersed in the monobath developer for two minutes and washed in water for one minute. The strip was bathed in a one percent lauryl mercaptan/ethanol solution for one minute and washed with water for one minute. The adjuvant treatment was repeated, and the strip was dried. The strip was mounted on a conventional offset duplicating press and about 500 positive copies were obtained with no significant signs of deterioration.

EXAMPLE V

A monobath developer solution was prepared as follows:

| | | |
|---|---|---|
| Water | ml | 800 |
| Sodium sulfite (anhydrous) | ml | 80 |
| Hydroquinone (anhydrous) | gm | 16 |
| 1-phenyl-4-methyl-3-pyrazolidone (reagent grade) | gm | 1 |
| Boric acid ($H_3BO_3$) | gm | 5.5 |
| Potassium bromide (anhydrous) | gm | 2 |
| 6-nitrobenzimidazole nitrate (one gram dissolved in sufficient ethanol to make up 100 ml. of solution) | ml | 40 |
| Sodium hydroxide (24 grams dissolved in sufficient water to make up 100 ml. of solution) | ml | 100 |
| Water to make up to 1000 ml. | | |
| Potassium thiocyanate (100 grams dissolved in 100 ml. water to make up 154 ml. of solution | ml | 30 |
| Sodium sulfide (0.1 molar solution) | ml | 10 |

A photographic film of the lithographic type was exposed at a distance of 24 inches for 20 seconds to a #2 General Electric Photoflood lamp operated at 13 v. A.C. Exposure was through a positive having a density of 1.4 which was done to simulate a camera exposure. The film was comprised of a high contrast silver chloride-silver bromide orthochromatically sensitized emulsion, in which the silver salt contained 20 mole percent silver bromide and 80 mole percent silver chloride and containing 110 grams of gelatin per mol of silver halide, overcoated with a clear hardened gelatin layer, containing silica particles, and a base coated with a dyed gelatin-NH backing. The exposed film was immersed for one minute in the monobath developer solution and then washed with water for three minutes. A high contrast, highly-reflective, positive silver image was obtained on and/or in the antiabrasion surface coating of the emulsion layer.

An adjuvant solution was prepared as follows:

| | Ml. |
|---|---|
| t-Hexadecyl mercaptan (one gram dissolved in sufficient ethanol to make up 100 ml. of solution) | 10 |
| Ammonium hydroxide (0.9 specific gravity) | 1 |
| Ethanol to make up 100 ml. | |

The film was treated on the emulsion side with the above adjuvant solution and then washed with water. This film constituted a printing plate. The film strip was wetted with five percent acetic acid. A conventional greasy lithographic ink was applied to a printer's hard rubber roller and the roller was used to apply ink to the film strip until ink appeared to adhere imagewise to the strip. A white piece of paper was placed on the inked side of the strip, pressed smooth, and removed. Many positive copies were obtained thereafter when the same procedure was carried out.

EXAMPLE VI

A light-sensitive photographic lithographic film as described in Example V was exposed under identical conditions and in an identical manner as described in Example V. The exposed film was immersed in a monobath developer solution, which was identical to the monobath developer solution described in Example V, for one minute and then washed with water for three minutes. A high contrast, highly-reflective, positive silver image was obtained on and/or in the antiabrasion surface coating of the emulsion layer. An adjuvant solution, using benzyl mercaptan as the adjuvant, was prepared in an identical manner as the one described in Example V. The film was treated on the emulsion side with the above adjuvant solution and then washed with water. This film constituted a printing plate. After treatment with acetic acid and ink, as described in Example V, a positive copy was obtained. Many positive copies were obtained by repeating the treatment and printing steps.

EXAMPLE VII

A photographic film of the lithographic type as described in Example V was exposed in a camera through the base of the film so that there was lateral image reversal. The exposed film was immersed in a monobath developer solution, which was identical to the one described in Example V, for one minute and then washed in water for three minutes. A high contrast, highly-reflective, positive silver image was obtained on and/or in the antiabrasion surface coating of the emulsion layer. An adjuvant solution, using 2-mercapto-4-phenylthiazole as the adjuvant, was prepared in an identical manner as the one described in Example V. The film was treated on the emulsion side with the above adjuvant solution and then washed with water. This film constituted a printing plate. After treatment with acetic acid and ink, as described in Example V, a positive copy was obtained. Many positive copies were obtained thereafter when the same printing procedure was carried out.

EXAMPLE VIII

A monobath developer solution was prepared as follows:

| | | |
|---|---|---|
| Water | ml | 750 |
| Sodium sulfite | gm | 40 |
| Hydroquinone | gm | 11 |
| Potassium carbonate | gm | 20 |
| Sodium hydroxide (12 grams dissolved in sufficient water to make up 100 ml. of solution) | ml | 100 |
| 1-phenyl-3-pyrazolidone | gm | 1 |
| 6-nitrobenzimidazole nitrate (1 gram dissolved in a sufficient ethanol to make up 100 ml. of solution) | ml | 10 |
| Potassium thiocyanate (100 grams dissolved in 100 ml. of water to make up 154 ml. of solution) | ml | 30 |
| Thiourea (0.1 molar solution) | ml | 4 |
| Water to make up to 1000 ml. | | |

A photographic film of the lithographic type as described in Example V was exposed at a distance of 24 inches for 20 seconds to a #2 General Electric Photoflood lamp operated at 17 volts A.C. The exposure was through a positive having a density of 1.4. The exposed film was immersed in the monobath developer solution for one minute and washed with water for three minutes. A high contrast, highly-reflective, positive silver image was obtained on and/or in the antiabrasion layer. An adjuvant, using 1-heptanethiol as the adjuvant, was prepared in an identical manner as the one described in Example V. The film was treated on the emulsion side with the above adjuvant solution and then washed with water. This film constituted a printing plate. After treatment with acetic acid and ink, as described in Example V, a positive copy was obtained. Many positive copies were obtained thereafter when the same printing procedure was carried out.

An identical film was exposed in the same manner and developed in the same monobath developer for the same immersion period, but was not treated with the adjuvant. The untreated plate was also used as a printing plate, but the treated plate gave better quality copies, quicker start-up and longer plate life.

EXAMPLE IX

A photographic film of the lithographic type as described in Example V was exposed in a camera through the base of the film so that there was lateral image reversal. The exposed film was immersed in a monobath developer solution, which was identical to the one described in Example VIII, for one minute and then washed in water for three minutes. A high contrast, highly-reflective, positive silver image was obtained on and/or in the antiabrasion surface coating of the emulsion layer. An adjuvant solution, using tert-amyl mercaptan as the adjuvant, was prepared in an identical manner as the one described in Example V. The film was treated on the emulsion side with the above adjuvant solution and then washed with water. This film constituted a printing plate. After treatment with acetic acid and ink, as described in Example V, a positive copy was obtained. Many positive copies were obtained thereafter when the same printing procedure was carried out.

EXAMPLE X

A photographic film of the lithographic type as described in Example V was exposed under identical conditions and in an identical manner as described in Example VIII. The exposed film was immersed in a monobath developer solution, which was identical to the one described in Example VIII, for one minute and then washed in water for three minutes. A high contrast, highly-reflective, positive silver image was obtained on and/or in the antiabrasion surface coating of the emulsion layer. An adjuvant solution, using dodecylbenzyl mercaptan as the adjuvant, was prepared in an identical manner as the one described in Example V. The film was treated on the emulsion side with the above adjuvant solution and then washed with water. This film constituted a printing plate. After treatment with acetic acid and ink, as described in Example V, a positive copy was obtained. Many positive copies were obtained thereafter when the same printing procedure was carried out.

EXAMPLE XI

A photographic film of the lithographic type as described in Example V was exposed under identical conditions and in an identical manner as described in Example VIII. The exposed film was immersed in a monobath developer solution, which was identical to the one described in Example VIII, for one minute and then washed in water for three minutes. A high contrast, highly-reflective, positive silver image was obtained on and/or in the antiabrasion surface coating of the emulsion layer. An adjuvant solution, using stearyl thioglycolate as the adjuvant was prepared in an identical manner as the one described in Example V. The film was treated on the emulsion side with the above adjuvant solution and then washed with water. This film constituted a printing plate. After treatment with acetic acid and ink, as described in Example V, a positive copy was obtained. Many positive copies were obtained thereafter when the same printing procedure was carried out.

EXAMPLE XII

A photographic film of the lithographic type as described in Example V was exposed under identical conditions and in an identical manner as described in Example VIII. The exposed film was immersed in a monobath developer solution, which was identical to the one described in Example VIII, for one minute and then washed in water for three minutes. A high contrast, highly-reflective, positive silver image was obtained on and/or in the antiabrasion surface coatings of the emulsion layer. An adjuvant solution, using stearyl thioglycolate as the adjuvant, was prepared in an identical manner as described in Example V, but in this example acetone instead of ethanol was used as the solvent. The film was treated on the emulsion side with the above adjuvant solution and then was washed with water. This film constituted a printing plate. After treatment with acetic acid and ink, as described in Example V, a positive copy was obtained. Many positive copies were obtained thereafter when the same printing procedure was carried out. A better quality copy was obtained with acetone as the solvent for stearyl thioglycolate when compared with ethanol as the solvent because stearyl thioglycolate is only slightly soluble in ethanol.

EXAMPLE XIII

A photographic film of the lithographic type as described in Example V was exposed under identical conditions and in an identical manner as described in Example VIII. The exposed film was immersed in a monobath developer solution, which was identical to the one described in Example VIII, for one minute and then washed in water for three minutes. A high contrast, highly-reflective, positive silver image was obtained on and/or in the antiabrasion surface coating of the emulsion layer. An adjuvant solution, using stearyl mercaptan as the adjuvant, was prepared in an identical manner as the one described in Example V. The film was treated on the emulsion side with the above adjuvant solution and then washed with water. This film constituted a printing plate. After treatment with acetic acid and ink, as described in Example V, a positive copy was obtained. Many positive copies were obtained thereafter when the same printing procedure was carried out.

EXAMPLE XIV

A light-sensitive lithographic type film as described in Example V was exposed under identical conditions and in an identical manner as described in Example VIII. The exposed film was immersed in a monobath developer solution, which was identical to the one described in Example VIII, for one minute and then washed in water for three minutes. A high contrast, highly-reflective, positive silver image was obtained on and/or in the antiabrasion surface coating of the emulsion layer. An adjuvant solution, using stearyl mercaptan, as the adjuvant, was prepared in an identical manner as described in Example V, but in this example acetone instead of ethanol was used as the solvent. The film was treated on the emulsion side with the above adjuvant solution and then washed with water. This film constituted a printing plate. After treatment with acetic acid and ink, as described in Example V, a positive copy was obtained. Many positive copies were obtained thereafter when the same printing procedure was carried out. A better quality copy was obtained with acetone as the solvent for stearyl mercaptan when compared with ethanol as the solvent because stearyl mercaptan is only slightly soluble in ethanol.

EXAMPLE XV

A light-sensitive film of the X-ray type was exposed at a distance of 24 inches for five seconds through a positive transparency in contact with the film by a #2 General Electric Photoflood lamp operated at 15 volts A.C. The film was comprised of a high speed bromoiodide emulsion, in which the silver salt contained approximately 1.5 mole percent silver iodide and 98.5 mole percent silver bromide and contained 200 grams of gelatin per mol of silver halide, coated on both sides of a polyester base with the emulsion being overcoated with an antiabrasion layer. The exposed film was immersed in a monobath developer solution which was identical to the monobath developer solution described in Example VIII, for two minutes. The film was then immersed in 5 percent aqueous acetic acid to stop the developing action and subsequently washed for ½ minute in water. The film was placed in a formaldehyde hardening solution for five minutes and washed with water for one minute. The strip was treated with a one percent lauryl mercaptan-ethanol solution, and then washed with water for one minute. This film strip constituted a printing plate. The strip was dried and mounted on a conventional offset duplicating press. The strip produced about 200 positive copies and allowed nearly instant start up.

EXAMPLE XVI

A monobath developer solution was prepared as follows:

| | | |
|---|---|---|
| Water | ml | 750 |
| Sodium sulfite (anhydrous) | gm | 80 |
| Hydroquinone (anhydrous) | gm | 16 |
| 1-phenyl-4-methyl-3-pyrazolidone (reagent grade) | gm | 1 |
| Boric acid ($H_3BO_3$) | gm | 5.5 |
| 6-nitrobenzimidazole-nitrate (one gram dissolved in sufficient ethanol to make up 100 ml. of solution) | ml | 40 |
| Sodium hydroxide (24 grams dissolved in sufficient water to make up 100 ml.) | ml | 100 |
| Water to make up to 1000 ml. | | |
| Sodium sulfite (anhydrous) | gm | 25 |

A solution containing a nucleating agent was prepared as follows:

| | Ml. |
|---|---|
| Sodium sulfide (0.1 molar solution) | 5 |
| Ethanol to make up to 100 ml. | |

A rubber stamp was wetted on the printing surface with the above solution which contained a nucleating agent. The wetted rubber stamp was pressed against the emulsion side of a photographic film of the lithographic type as described in Example V. The wet image on the film was allowed to dry for one minute. The film was immersed in the monobath developer solution for one minute, and washed with water for one minute. The areas that had been pressed with the nucleating agent formed a silver surface image on and/or in the antiabrasion layer. This demonstrates another use of the broad principle of using silver transfer development to obtain a printing plate. The film was then treated with a one percent lauryl mercaptan/ethanol solution, and washed with water. The film was rubbed with a conventional greasy lithographic ink, pressed against a white sheet of paper, removed to yield a positive copy on the white piece of paper.

EXAMPLE XVII

A monobath developer solution was prepared by adding 10 ml. of sodium sulfide (0.1 molar solution) and 30 grams of potassium bromide (anhydrous) to the monobath developer solution described in Example XVI.

A solution containing a fogging agent was prepared as follows:

| | Ml. |
|---|---|
| Potassium iodide (0.5 molar solution) | 10 |
| Ethanol to make up to 100 ml. | |

A rubber stamp was wetted on the printing surface with the above solution which contained a fogging agent. The wetted rubber stamp was pressed against the emulsion side of a light-sensitive photographic lithographic film as described in Example V. The wet area on the film was allowed to dry for one minute. The film was immersed in the monobath developer solution for one minute and washed with water for one minute. The potassium iodide functioned as a fogging agent similar in its effect to light, thereby preventing the formation of the silver image through silver transfer development in those areas where the potassium iodide was placed on the antiabrasion layer. This technique allowed a negative image to be formed. The film was then treated with one percent lauryl mercaptan-ethanol solution and washed with water. The film was rubbed with a conventional greasy lithographic ink, pressed against a white sheet of paper and removed to yield a negative copy on the white piece of paper.

EXAMPLE XVIII

A monobath developer solution was prepared as follows:

| | | |
|---|---|---|
| Water | ml | 1600 |
| Sodium sulfite (anhydrous) | gm | 160 |
| 2,4-diaminophenol | gm | 36 |
| Boric acid ($H_3BO_3$) | gm | 11 |
| 6-nitrobenzimidazole nitrate (one gram dissolved in sufficient ethanol to make up 100 ml. of solution) | ml | 80 |
| Water to make up to 2000 ml. | | |

The nucleating solution was prepared as follows:

| | Ml. |
|---|---|
| Water | 1000 |
| Sodium hydroxide (12 grams dissolved in sufficient water to make up 100 ml. of solution) | 400 |
| Sodium sulfide (0.1 molar solution) | 20 |
| Potassium thiocyanate (100 grams dissolved in 100 ml. of water to make up 154 ml. of solution) | 60 |
| Water to make up to 2000 ml. | |

A photographic film of the lithographic type as described in Example V was exposed at a distance of 24 inches for 20 seconds to a #2 General Electric Photoflood lamp operated at 17 volts A.C. The exposure was through a positive having a density of 1.4. The exposed film was immersed for one minute in the monobath developer, washer with water for 30 seconds, immersed in the nucleating solution for one minute and then washed with water for 30 seconds. The exposed film was reimmersed in the monobath developer for one minute and washed with water for three minutes. A high contrast, highly-reflective, positive silver image was obtained on and/or in the antiabrasion layer. An adjuvant solution, using lauryl mercaptan as the adjuvant, was prepared in an identical manner as described in Example V. The film was treated on the emulsion side with the above adjuvant solution and then washed with water. This film constituted a printing plate. After treatment with acetic acid and ink, as described in Example V, many positive copies were obtained.

EXAMPLE XIX

A developer consisting of two-bath solutions was prepared as follows:

| | | |
|---|---|---|
| Water | ml | 3200 |
| Sodium sulfite (anhydrous) | gm | 320 |
| p-Methylaminophenol sulfate (reagent grade) | gm | 48 |
| 2,4-diaminophenol (reagent grade) | gm | 37.5 |
| Boric acid ($H_3BO_3$) | gm | 22 |
| Sodium hydroxide (24 grams dissolved in sufficient water to make up 100 ml. of solution) | ml | 100 |
| 6-nitrobenzimidazole nitrate (0.5 gram dissolved in a solution containing 50 ml. of ethanol and 50 ml. of water) | ml | 160 |

The solution was divided into two equal portions by volume. Water was added to the first equal portion to make up 200 ml. of solution, thereby preparing the first bath solution. The second bath solution was prepared by adding 20 ml. of 0.1 molar sodium sulfide solution and 20 grams of potassium thiocyanate (anhydrous) to the second equal portion, and then adding enough water to make up 2000 ml. of solution.

A photographic film of the lithographic type described in Example V was exposed at a distance of 24 inches for 25 seconds to a #2 General Electric Photoflood lamp operated at 13 v. A.C. Exposure was through a positive having a density of 1.4. The exposed film was immersed in the first bath for 30 seconds, washed with water for two minutes, immersed in the second bath for 30 seconds, and then washed with water for five minutes. A high contrast, highly-reflective, positive silver image was obtained on and/or in the antiabrasion layer. An adjuvant solution, using lauryl mercaptan as the adjuvant, was prepared in an identical manner as described in Example V. The film was treated with the above adjuvant solution and then washed with water. This film constituted a printing plate. After treatment with acetic acid and ink, as described in Example V, many positive copies were obtained.

An identical film was exposed in the same manner and developed in the same two-bath developer utilizing the same immersion periods, but was not treated with the adjuvant. The untreated plate was also used as a printing plate, but the treated plate gave better quality copies, quicker start-up and longer plate life.

EXAMPLE XX

A monobath developer solution was prepared as follows:

| | | |
|---|---|---|
| Water | ml | 400 |
| Sodium sulfite (anhydrous) | gm | 67 |
| Hydroquinone (anhydrous) | gm | 20 |
| Ethylene glycol (reagent grade) | ml | 133 |
| 1-phenyl-3-pyrazolidone (reagent grade) | gm | 2 |
| n-Methyl-2 pyrrolidone | ml | 7 |
| Sequestrene® NA3T (trisodium salt of ethylene diamine tetra-acetic acid) | gm | 0.3 |
| Potassium carbonate (anhydrous) | gm | 53 |
| Sodium hydroxide | gm | 26 |
| Benzothiazole | gm | 1.0 |
| Sodium sulfide (0.1 molar solution) | ml | 20 |
| Potassium thiocyanate | gm | 31.5 |

Water to make up to 2000 ml.

A photographic film of the lithographic type as described in Example V was exposed at a distance of 25 inches for 20 seconds to a #2 General Electric Photoflood lamp operated at 17 v. A.C. Exposure was through a positive having a density of 1.4. The exposed film was immersed in the monobath developer solution for one minute and then washed with water for three minutes. A high contrast, highly-reflective, positive silver image was obtained on and/or in the antiabrasion layer. An adjuvant solution, using lauryl mercaptan as the adjuvant, was prepared in an identical manner as described in Example V. The film was treated with the above adjuvant solution and then washed with water. This film constituted a printing plate. After treatment with acetic acid and ink, as described in Example V, printing was carried out on a conventional offset duplicating press. There was immediate start-up. About 5,000 positive copies were obtained from a 65-line halftone type of plate without any significant deterioration of the plate. The quality of the positive copies was excellent.

An identical film was exposed in the same manner and developed in the same monobath developer for the same immersion period, but was not treated with the adjuvant. The untreated plate was also used as a printing plate, but the treated plate gave better quality copies, quicker start-up and longer plate life.

EXAMPLE XXI

A monobath developer solution was prepared as described in Example XX except that only 21 grams of sodium hydroxide was used in the formulation.

A photographic film of the lithographic type as described in Example V was exposed under identical conditions and in an identical manner as described in Example XX. The exposed film was immersed in the monobath developer solution for one minute and then washed with water for three minutes. A high contrast, highly-reflective, positive silver image was obtained on and/or in the anti-abrasion layer. A one percent thiobenzanilide solution using ethanol as the solvent was prepared. The film was treated with the thiobenzanilide-ethanol solution and then washed with water. This film constituted a printing plate. After treatment with acetic acid and ink, as described in Example V, printing was carried out on a conventional offset duplicating press. About 600 positive copies were obtained without any significant deterioration of the plate.

EXAMPLE XXII

A monobath developer solution was prepared as described in Example XX except that only 21 grams of sodium hydroxide was used in the formulations.

A photographic film of the lithographic type as described in Example V was exposed under identical conditions and in an identical manner as described in Example XX. The exposed film was immersed in the monobath developer solution for one minute and then washed with water for three minutes. A high contrast, highly-reflective, positive silver image was obtained on and/or in the antiabrasion layer. A one percent allyl isothiocyanate solution using ethanol as the solvent was prepared. The film was treated with the allyl isothiocyanate-ethanol solution and then washed with water. This film constituted a printing plate. After treatment with acetic acid and ink, as described in Example V, printing was carried out on a conventional offset duplicating press. About 800 positive copies were obtained without any significant deterioration of the plate.

EXAMPLE XXIII

A monobath developer solution was prepared as described in Example XX except that only 24 grams of sodium hydroxide was used in the formulation.

A light-sensitive photographic lithographic film as described in Example V was exposed under identical conditions and in an identical manner as described in Example XX. The exposed film was immersed in the monobath developer solution for one minute and then washed with water for three minutes. A high contrast, highly-reflective, positive silver image was obtained on and/or in the antiabrasion layer. A one percent phenylthiourea solution was prepared using ethanol as the solvent. The film was treated with the phenylthiourea-ethanol solution, and subsequently washed with water. This film constituted a printing plate. After treatment with acetic acid and ink, as described in Example V, printing was carried out on a conventional offset duplicating press. About 300 positive copies were obtained without any significant deterioration of the plate.

EXAMPLE XXIV

A monobath developer solution was prepared as described in Example XX except that only 30 grams of potassium thiocyanate was used in the formulation.

A photographic film of the lithographic type as described in Example V was exposed under identical conditions and in an identical manner as described in Example XX. The exposed film was immersed in the monobath developer solution for one minute and subsequently washed with water for three minutes. A high contrast, highly-reflective, positive silver image was obtained on and/or in the antiabrasion layer. A one-half percent potassium ethyl xanthate solution was prepared using ethanol as the solvent. The film was treated with the potassium ethyl xanthate-ethanol solution, and then washed with water. This film constituted a printing plate. After treatment with acetic acid and ink, as described in Example V, printing was carried out on a conventional offset duplicating press. About 400 positive copies were obtained without any significant deterioration of the plate.

An identical film was exposed in the same manner and developed in the same monobath developer for the same immersion period, but was not treated with the adjuvant.

The untreated plate was also used as a printing plate, but the treated plate gave better quality copies, quicker start-up and longer plate life.

EXAMPLE XXV

A monobath developer solution was prepared as described in Example XX except that only 30 grams of potassium thiocyanate was used in the formulation.

A photographic film of the lithographic type, as described in Example V was exposed under identical conditions and in an identical manner as described in Example XX. The exposed film was immersed in the monobath developer solution for one minute and then washed with water for three minutes. A high contrast, highly-reflective, positive silver image was obtained on and/or in the antiabrasion layer. A one percent 2-selenobenzoxazole solution was prepared using ethanol as the solvent. The film was treated with the 2-selenobenzoxazole-ethanol solution, and then washed with water. This film constituted a printing plate. After treatment with acetic acid and water, as described in Example V, printing was carried out on a conventional offset duplicating press. About 500 positive copies were obtained without any significant deterioration of the plate.

An identical film was exposed in the same manner and developed in the same monobath developer for the same immersion period, but was not treated with the adjuvant. The untreated plate was also used as a printing plate, but the treated plate gave better quality copies, quicker start-up, and longer plate life.

EXAMPLE XXVI

A monobath developer solution was prepared as described in Example XX except that only 30 grams of potassium thiocyanate was used in the formulation.

A photographic film of the lithographic type as described in Example V was exposed under identical conditions and in an identical manner as described in Example XX. The exposed film was immersed in the monobath developer solution for one minute and then washed with water for three minutes. A high contrast, highly-reflective, positive silver image was obtained on and/or in the antiabrasion layer. A one percent 2-selenobenzothiazole solution was prepared using ethanol as the solvent. The film was treated with the 2-selenobenzothiazole/ethanol solution, and then washed with water. This film constituted a printing plate. After treatment with acetic acid and water, as described in Example V, printing was carried out on a conventional offset duplicating press. About 900 positive copies were obtained without any significant deterioration of the plate.

An identical film was exposed in the same manner and developed in the same monobath developer for the same immersion period, but was not treated with the adjuvant. The untreated plate was also used as a printing plate, but the treated plate gave better quality copies, quicker start-up, and longer plate life.

EXAMPLE XXVII

A monobath developer solution was prepared as described in Example XX except that only 30 grams of potassium thiocyanate were used in the formulation.

A photographic film of the lithographic type, as described in Example V was exposed under identical conditions and in an identical manner as described in Example XX. The exposed film was immersed in the monobath developer solution for one minute and then washed with water for three minutes. A high contrast, highly-reflective, positive silver image was obtained on and/or in the antiabrasion layer. A one percent benzyl dithiocarbonate solution was prepared using ethanol as the solvent. The film was treated with the benzyl dithiocarbonate/ethanol solution, and then washed with water. This film constituted a printing plate. After treatment with acetic acid and water, as described in Example V, printing was carried out on a conventional offset duplicating press. About 450 positive copies were obtained without any significant deterioration of the plate.

EXAMPLE XXVIII

A monobath developer solution was prepared as described in Example XX except that only 30 grams of potassium thiocyanate was used in the formulation.

A photographic film of the lithographic type as described in Example V was exposed under identical conditions and in an identical manner as described in Example XX. The exposed film was immersed in the monobath developer solution for one minute and then washed with water for three minutes. A highly contrast, highly-reflective, positive silver image was obtained on and/or in the antiabrasion layer. A one percent benzyl dithiocarbazate solution was prepared using acetone as the solvent. The film was treated with the benzyl dithiocarbazate-acetone solution and then washed with water. This film constituted a printing plate. After treatment with acetic acid and ink, as described in Example V, printing was carried out on a conventional offset duplicating press. About 300 positive copies were obtained without any significant deterioration of the plate.

EXAMPLE XXIX

A monobath developer solution was prepared as follows:

| | | |
|---|---|---|
| Water | ml | 600 |
| Sodium sulfite (anhydrous) | gm | 33 |
| Hydroquinone (anhydrous) | gm | 10 |
| Ethylene glycol | ml | 67 |
| 1-phenyl-3-pyrazolidone | gm | 1 |
| N-methyl-2-pyrrolidone | ml | 3.3 |
| Sequestrene® NA3T (trisodium salt of ethylene diamine tetra-acetic acid) | gm | 0.17 |
| Potassium carbonate (anhydrous) | gm | 27 |
| Benzotriazole | gm | 0.5 |
| Potassium thiocyanate | gm | 15 |
| Sodium sulfide (nonahydrate) | gm | 0.24 |

Sodium hydroxide (3 normal solution) to pH 13.
Water to make up to 1000 ml.

A photographic film of the lithographic type as described in Example V was exposed at a distance of 24 inches for 20 seconds to a #2 General Electric Photoflood lamp operated at 17 volts A.C. Exposure was conducted in a camera through the case of the film so that there was lateral image reversal. The exposed film was immersed in the monobath for one minute and then washed with water for three minutes. A high contrast, highly-reflective, positive silver image was obtained on and/or in the antiabrasion layer. An adjuvant solution, using lauryl mercaptan as the adjuvant, was prepared in an identical manner as described in Example V. The film was treated with the above adjuvant solution and then washed with water. This film constituted a printing plate. The plate was treated with a solution of gum arabic in water containing asphaltum buffered to a pH of 2.5. Subsequently, the plate was treated by wetting with a solution of one percent zirconium oxychloride by weight in water. The plate was wet with an aqueous fountain solution and mounted on an offset printing press. There was immediate start-up. About 10,000 positive copies were obtained from a 65-line halftone type of plate without any significant deterioration of the plate. The quality of the positive copies was excellent.

EXAMPLE XXX

The first bath solution of a two-bath developer was prepared as follows:

| | | |
|---|---|---|
| Water | ml | 200 |
| Sodium sulfite (anhydrous) | gm | 33.3 |
| Hydroquinone (anhydrous) | gm | 10 |
| Ethylene glycol | gm | 66.6 |
| 1-phenyl-3-pyrazolidone | gm | 1 |
| n-Methyl-2-pyrrolidone | gm | 3.3 |
| Sequestrene® NA3T (trisodium salt of ethylene diamine tetra-acetic acid) | gm | 0.17 |
| Potassium carbonate (anhydrous) | gm | 26.6 |
| Sodium hydroxide (10 grams dissolved in sufficient water to make up 100 ml. of solution) | ml | 10 |
| Benzotriazole | gm | 0.5 |
| Water to make up to 1000 ml. | | |

The second bath solution was prepared as follows:

| | Ml. |
|---|---|
| Water | 500 |
| Sodium sulfide (0.1 molar solution) | 10 |
| Sodium thiosulfate (40 grams dissolved in sufficient water to make up 100 ml. of solution) | 10 |
| Water to make up to 1000 ml. | |

A photographic film of the lithographic type was exposed at a distance of 24 inches for 20 seconds to a #2 General Electric Photoflood lamp operated at 17 v. A.C. Exposure was through a positive having a density of 1.4. The film was comprised of a high contrast silver chloride-silver bromide emulsion, in which the silver salt contained 30 mole percent silver bromide and 70 mole percent silver chloride, and which contained 50 grams of gelatin per mole of silver halide, and a polyester base. The film did not have an antiabrasion layer. The exposed film was immersed for one minute in the first bath and washed for 15 seconds with water; immersed for 30 seconds in the second bath and washed for 15 seconds with water; immersed again for one minute in the first bath and washed for three minutes with water. A high contrast highly-reflective, positive silver image was obtained on and/or in the surface of the emulsion layer. An adjuvant solution, using lauryl mercaptan as the adjuvant, was prepared in an identical manner as the one described in Example V. The film was treated on the emulsion side with the above adjuvant solution and then washed with water. This film constituted a printing plate. After treatment with acetic acid and ink, as described in Example V, a positive copy was obtained. Many positive copies were obtained thereafter when the same printing procedure was carried out.

EXAMPLE XXXI

A monobath developer solution was prepared as described in Example XX except that only 30 grams of potassium thiocyanate was used in the formulation.

A photographic film of the lithographic type described in Example V was exposed under identical conditions and in an identical manner as described in Example XX. The exposed film was immersed in the monobath developer solution for one minute and then washed in water for three minutes. A high contrast, highly-reflective positive silver image was obtained on and/or in the antiabrasion surface coating of the emulsion layer.

An adjuvant solution was prepared as follows:

| | Ml. |
|---|---|
| Triphenylphosphine oxide (one gram dissolved in sufficient ethanol to make up 100 ml. of solution) | 10 |
| Ethanol to make up 100 ml. | |

The film was treated on the emulsion side with the above adjuvant solution and then washed with water.

This film constituted a printing plate. After treatment with acetic acid and ink, as described in Example V, printing was carried out on a conventional offset duplicating press. About 700 positive copies were obtained without any significant deterioration of the plate.

EXAMPLE XXXII

A monobath developer solution was prepared as described in Example XX except that only 21 grams of sodium hydroxide was used in the formulation.

A photographic film as described in Example I was exposed at a distance of 24 inches for 30 seconds to a #2 General Electric Photoflood lamp operated at 13 v. A.C. Exposure was through a positive having a density of 1.4.

The exposed film was immersed in a monobath developer solution, which was identical to the one described in Example XX for one minute and then washed in water for three minutes. A high contrast, highly-reflective, positive silver image was obtained on and/or in the antiabrasion surface coating of the emulsion layer. An adjuvant solution, using 3,3′-diethylthiacyanine bromide as the adjuvant, was prepared in an identical manner as the one described in Example XXXI. The film was treated on the emulsion side with the above adjuvant solution and then washed with water. This film constituted a printing plate. After treatment with acetic acid and ink, as described in Example V, printing was carried out on a conventional offset duplicating press. About 700 positive copies were obtained without any significant deterioration of the plate.

EXAMPLE XXXIII

A monobath developer solution was prepared as described in Example XX except that only 21 grams of sodium hydroxide was used in the formulation.

A photographic film as described in Example V was exposed under identical conditions and in an identical manner as described in Example XX. The exposed film was immersed in a monobath developer solution, which was identical to the one described in Example XX, for one minute and then washed in water for three minutes. A high contrast, highly-reflective, positive silver image was obtained on and/or in the antiabrasion surface coating of the emulsion layer. An adjuvant solution, using n-decylamine as the adjuvant, was prepared in an identical manner as described in Example XXXI. The film was treated on the emulsion side with the above adjuvant solution and then washed with water. This film constituted a printing plate. After treatment with acetic acid and ink, as described in Example V, printing was carried out on a conventional offset duplicating press. About 500 copies were obtained without any significant deterioration of the plate.

EXAMPLE XXXIV

A photographic film of the lithographic type was exposed at a distance of 24 inches for 20 seconds to a #2 General Electric Photoflood lamp operated at 17 volts A.C.

Exprosure was through a positive having a density of 1.4. The film was comprised of a high contrast silver chloride-silver bromide emulsion, in which the silver salt contained 30 mole percent silver bromide and 70 mole percent silver chloride, and which contained 50 grams of gelatin per mole of silver halide, and a polyester base. The film did not have an antiabrasion layer. The film was immersed for one minute in the first bath described in Example XXX and washed for 15 seconds with water; immersed for 30 seconds in the second bath described in Example XXX and washed for 15 seconds with water; immersed again for one minute in the first bath and washed for three minutes with water. A high contrast, highly-reflective, positive silver image was obtained on and/or in the surface of the emulsion layer. An adjuvant solution, using lauryl mercaptan as the adjuvant was prepared in an identical manner as the one described in Example XXXI. The film was treated on the emulsion side with the above adjuvant solution and then washed with water. This film constituted a printing plate. After treatment with acetic acid and ink, as described in Example V, printing was carried out on a conventional offset duplicating press. Many positive copies were obtained without any significant deterioration of the plate.

EXAMPLE XXXV

The first bath solution of the two-bath developer was prepared as follows:

| | | |
|---|---|---|
| Water | ml | 3000 |
| 1-phenyl-3-pyrazolidone | gm | 4 |
| Ascorbic acid | gm | 40 |
| Sodium carbonate (anhydrous) | gm | 80 |
| Sodium hydroxide (10 grams dissolved in sufficient water to make up 100 ml. of solution) | ml | 20 |
| Water to make up to 4000 ml. | | |

The second bath solution was prepared as follows:

| | | |
|---|---|---|
| Water | ml | 2600 |
| Sodium sulfite (anhydrous) | gm | 400 |
| Hydroquinone | gm | 8 |
| 1-phenyl-3-pyrazolidone | gm | 0.5 |
| Boric acid ($H_3BO_3$) | gm | 11 |
| Sodium hydroxide (10 grams dissolved in sufficient water to make up 100 ml. of solution) | ml | 20 |
| Sodium sulfide (0.1 molar solution) | ml | 20 |
| Water to make up to 3000 ml. | | |
| Sodium hydroxide (3.0 normal solution) | ml | 190 |

A photographic film of the lithographic type was exposed at a distance of 26 inches for 10 seconds to a #2 General Electric Photoflood lamp operated at 40 v. A.C. Exposure was through a positive having a density of greater than four. The film was comprised of a silver chloride emulsion, which contained 47 grams of gelatin per mole of silver chloride, overcoated with a clear hardened gelatin layer, and a thick cellulose triacetate base. The exposed film was immersed in the first bath for 30 seconds and washed for 10 minutes with water, and then immersed in the second bath for 2 minutes and washed for 5 minutes with water. A high contrast, highly-reflective, positive silver image was obtained on and/or in the antiabrasion surface coating of the emulsion layer. An adjuvant solution, using lauryl mercaptan as the adjuvant, was prepared in an identical manner as the one described in Example XXXI. The film was treated on the emulsion side with the above adjuvant solution and then washed with water. This film constituted a printing plate. After treatment with acetic acid and ink, as described in Example V, printing was carried out on a conventional offset duplicating press. Many positive copies were obtained without any significant deterioration of the plate.

As already mentioned, a two-bath developer may be used. The same set of agents may be used in both developer baths, or two different sets of agents can be utilized, or a single agent may be used in both developer baths. When a two-bath developer is used the nucleating agent and the silver halide are normally placed in the second bath. The first bath should contain no mercaptan-type anti-fogging agent and minimal amounts of potassium bromide. The nucleating agent may be placed in the first bath but the silver halide solvent must be restricted to the second bath. The above discussion also applies when a single-agent developer is used in the first bath in conjunction with a two-agent developer in the second bath. In effect, a two-bath developer can be arranged by starting with a two-agent developer to which, after the first stage of development is accomplished, is added the nucleating agent and silver halide solvent. If a single-agent developer is used first, another appropriate developing agent can be added with the silver halide solvent and nucleating agent. Or, if a two-agent developer is used first, the nucleating agent can be added at the start, and then, after that stage of development is accomplished, the silver halide solvent can be added. Or, if a single agent developer is used, the nucleating agent can be added at the start, and then after that stage of development, another appropriate developing agent and the silver halide solvent can be added. In all of the cases in which a monobath developer is used as a dual-bath developer, the starting solution should contain no mercaptan type antifogging agent and minimal amounts of potassium bromide. The foregoing discussion on the various combinations of monobath and two-bath developer utilization is in no way an all-inclusive listing of possible combinations and is not meant to exclude operative combinations which are not specifically mentioned.

Although the light-sensitive element is preferably transparent so that it can be exposed from either the front or back, an element with an opaque backing, support, etc., can be exposed from the front and subsequently developed so that there is a necessary silver transfer to the unexposed surface region.

The preferred method of exposure is in a camera through the base or to the emulsion using an image reversing prism so that there is lateral image reversal. Hence in that manner a correctly oriented positive copy can be obtained when the light-sensitive element is ultimately used as a printing plate.

The organic colloid of the silver halide emulsion layer used in this invention is not especially critical and may be gelatin, or, in place of gelatin, other natural or synthetic organic colloid binding agents. Such agents include water-permeable or water-soluble polyvinyl alcohol and its derivatives, e.g., partially hydrolyzed polyvinyl acetates, polyvinyl ethers, and acetals containing a large number of extralinear —$CH_2CHOH$— groups; hydrolyzed interpolymers of vinyl acetate and unsaturated addition polymerizable compounds such as maleic anhydride, acrylic and methacrylic acid ethyl esters, and styrene. Suitable colloids of the last mentioned type are disclosed in U.S. Patents 2,276,322, 2,276,323, and 2,347,811. The useful polyvinyl acetals include polyvinyl acetaldehyde acetal polyvinyl butyraldehyde acetal and polyvinyl sodium o-sulfobenzaldehyde acetal. Other useful colloid binding agents include poly-n-vinyllactams of Bolton U.S. Patent 2,495,918, the oleophobic copolymers of N-acrylamide alkyl betaines described in Shacklett, U.S. Patent 2,833,050 oleophobic cellulose ethers and esters, colloidal albumin, zein, and polyacrylamide.

Similarly, the silver halide emulsion may be selected from well known emulsions containing silver chloride, or silver bromide, or mixtures of two or more compounds from the group consisting of silver chloride, silver bromide and silver iodide, as well as, containing optical and chemical sensitizing agents, fog-stabilizing compounds, emulsion hardeners, plasticizing compounds, wetting agents, toners, and matting agents.

The film support for the emulsion layers used in the novel process may be any suitable transparent plastic. For example, the cellulosic supports, e.g., cellulose acetate, cellulose triacetate, cellulose mixed esters, etc. may be used. Polymerized vinyl compounds, e.g., copolymerized vinyl acetate and vinyl chloride, polystyrene, and polymerized acrylates may also be mentioned. The film formed from the polyesterification product of a dicarboxylic acid and a dihydric alcohol made according to the teachings of Alles, U.S. Patent 2,779,684, and the patents referred to in the specification of that patent. Other suitable supports are the polyethylene terephthalate/isophthalates of British Patent 766,290 and Canadian Patent 562,672 and those obtainable by condensing terephthalic acid and dimethyl terephthalate with propylene glycol, diethylene glycol, tetramethylene glycol or cyclohexane 1,4-dimethanol (hexahydro-p-xylene alcohol). The films of Bauer et al., U.S. Patent 3,052,543, may also be used. The above polyester films are particularly suitable because of their dimensional stability.

Paper is another example of a suitable support for this novel process of obtaining the planographic printing form, if this paper is coated with a water-resisting and oleophobic layer, for example, with a hardened gelatin layer or superficially saponified cellulose acetate. Into such layers there may be incorporated matting agent such as titanium dioxide, silicon dioxide, barium sulfate, in varying quantities.

As the support for the planographic printing form, it is further possible to use plates consisting of metals, alloys, or metal oxides coated metal.

The light-sensitive element may or may not contain an antiabrasion layer, although its presence is preferred.

Besides immersing the light-sensitive element in the developer or developers solutions, other methods of applying the solutions can be used such as dip roll, hopper, spray and the like so that a sufficient amount of solution is applied to the surface. It is probable that a highly viscous developer could be placed on the emulsion to provide semi-dry processing.

Just prior to the adjuvant treatment the printing plate can be treated with formaldehyde which hardens the emulsion and antiabrasion layers thereby lengthening the useful life of the printing plate.

As most of the useful adjuvants, e.g., the mercaptans, are insoluble in water it is not generally practical to use them in the fountain solution. Under special conditions, adjuvants emulsified with a wetting agent, or RSH and RNH compounds having water loving groups, can be incorporated in the fountain solution. That being the case, the adjuvant addition to the fountain solution can be incorporated as means of eliminating the separate step of first treating the printing plate with the adjuvant, although this is not a preferred embodiment of the invention. Certain adjuvants that are compatible with the printing ink can be incorporated in the ink while still retaining the quick-start characteristic of the printing plate.

There are several simple plate eradication methods that can be used with this printing plate that are effective in removal of unwanted portions of the printing image on the face of the plate. One very simple method of plate eradication is rubbing the area designated for removal with a cotton swab dipped in gum arabic or even an ordinary rubber eraser.

When using prior art printing plates, usually, an ordinary negative is made and this is used for making a positive oleophilic image on the printing plate by contact exposure. A large number of prior art processes have been used. This invention eliminates the extra step of preparing the printing plate by contact exposure since the prior art step of making a negative is replaced herein by the direct preparation of the printing plate by, e.g., exposing directly in a camera.

This novel process produces copies with excellent sharpness and gives rendition of the detail with a clean white background throughout prolonged use. The photolithographic process of the invention has the advantages that it is simple, effective, convenient and versatile.

A printing plate made by the process taught by this invention has the important characteristic of being able to immediately start producing useable copies. It also has the ability to immediately print satisfactory copies after a period of machine shutdown. The plate will permit the making of erasures without causing undesirable marks to appear. The plate has a long printing life, is easy to make, cheap, and easy to use for printing. A better quality copy and faster start-up are obtained from the plate when the adjuvant is added. All experiments showed faster start-up when the adjuvant treated plate was used for printing than when untreated controls were used.

What is claimed is:

1. A process for preparing inked printing plates and using said plates to print by lithography which comprises:

(1) forming a metallic silver image in an outer water-permeable hydrophilic integral colloid layer of a photographic film element having an exposed water-permeable organic colloid-silver halide emulsion layer by silver transfer development in an aqueous developer solution containing hydroquinone or 2,4-diaminophenol or mixtures of either compound with 1-phenyl-3-pyrazolidone, 1-phenyl-4-methyl-3-pyrazolidone or p-methylaminophenol, a water-soluble nucleating agent and a silver halide solvent, and washing the developed film with water, whereby a metallic silver image is formed at the surface of said colloid layer in unexposed areas;

(2) treating the surface of said element with a liquid solution having dissolved therein an adjuvant containing an oleophilic group and a group selected from the class consisting of:
  (a) —SH or a group enolizable to —SH,
  (b) —SR where R is an easily hydrolyzable group to give —SH,
  (c) a thioacid group,
  (d) a thioamide group,
  (e) a selenium analogue of groups (a) through (d),
  (f) an isothiocyanate group,
  (g) a cyanine dye group,
  (h) an amine group, and
  (i) a phosphine or phosphine oxide group, which adjuvant becomes integrated with the silver of the silver surface image, said adjuvant being adsorbed to the silver of said image;

(3) treating the surface of said element with an aqueous fountain solution;

(4) applying to the treated surface an ink having an oleophilic binder; and (5) using the resulting element as a plate to print by lithography.

2. A process according to claim 1 wherein the adjuvant contains an oleophilic group.

3. A process according to claim 1 wherein said adjuvant is a mercaptan having at least 4 carbon atoms.

4. A process according to claim 1 wherein said adjuvant is an alkyl mercaptan of 4–18 carbon atoms in ethanol solution.

5. A process according to claim 1 wherein said adjuvant is dodecyl mercaptan.

6. A process according to claim 1 wherein said colloid layer constitutes the outer layer.

7. A process according to claim 1 wherein said image is a positive image.

8. A process according to claim 1 wherein said image is a negative image.

9. A process according to claim 1 wherein the exposed silver halide colloid layer is from imagewise exposure to actinic radiation.

10. A process according to claim 1 wherein the exposed silver halide colloid layer is from imagewise chemical exposure.

11. A process according to claim 1 wherein said colloid is gelatin.

12. A process according to claim 1 wherein the colloid is a gelatin-silver chlorobromide colloid.

13. A process according to claim 1 wherein the aqueous solution of step (3) contains aqueous acetic acid.

14. A process according to claim 1 wherein the development step is carried out in a single aqueous developer solution containing a silver halide solvent and a silver nucleating agent.

15. A process according to claim 1 wherein the development is carried out in two steps in two developer solutions, the silver halide solvent for silver transfer development being present in the second solution.

(References on following page)

References Cited

UNITED STATES PATENTS

| | | | |
|---|---|---|---|
| Re. 25,885 | 10/1965 | Yackel et al. | 96—33 |
| 2,607,685 | 8/1952 | Land | 96—29 |
| 2,662,822 | 12/1953 | Land | 96—29 |
| 3,083,097 | 3/1963 | Lassig et al. | 96—29 |
| 3,033,765 | 5/1962 | King et al. | 204—15 |
| 3,186,842 | 6/1965 | De Haes et al. | 96—29 |

FOREIGN PATENTS

| | | |
|---|---|---|
| 884,457 | 12/1961 | Great Britain. |

GEORGE F. LESMES, Primary Examiner

J. P. BRAMMER, Assistant Examiner

U.S. Cl. X.R.

96—33, 66